No. 782,564. PATENTED FEB. 14, 1905.
L. A. KEENE.
AXLE.
APPLICATION FILED JUNE 25, 1904.
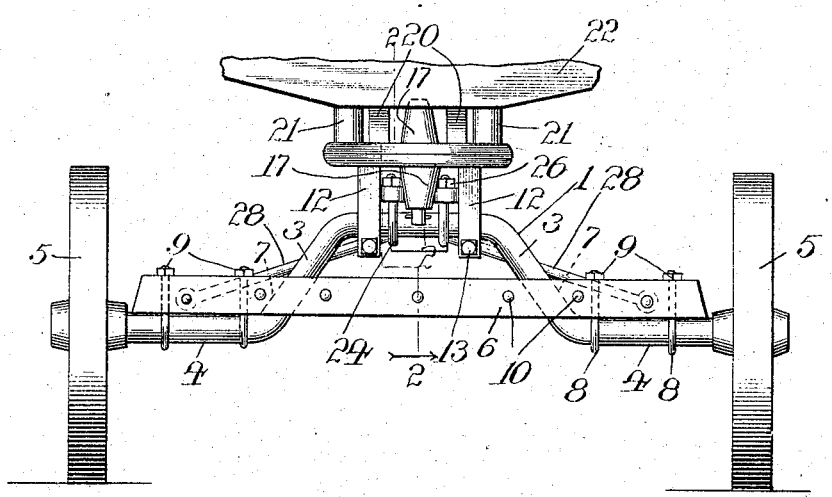
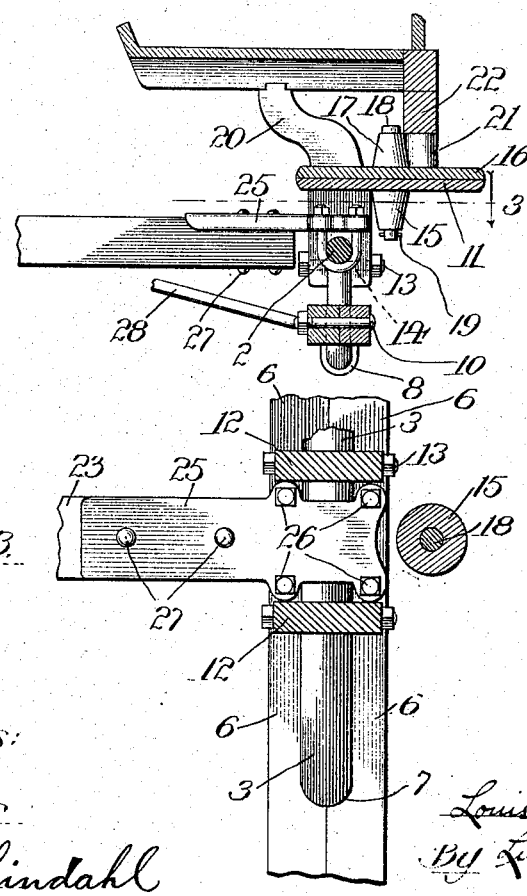
Witnesses:
Inventor:
Louis A. Keene
By Luther L. Miller
Atty.

No. 782,564. Patented February 14, 1905.

UNITED STATES PATENT OFFICE.

LOUIS A. KEENE, OF WATERMAN, ILLINOIS.

AXLE.

SPECIFICATION forming part of Letters Patent No. 782,564, dated February 14, 1905.

Application filed June 25, 1904. Serial No. 214,205.

*To all whom it may concern:*

Be it known that I, LOUIS A. KEENE, a citizen of the United States, residing at Waterman, in the county of Dekalb and State of Illinois, have invented certain new and useful Improvements in Axles, of which the following is a specification.

The object of this invention is the production of an improved axle for vehicles wherein simplicity of construction is combined with great strength.

In the accompanying drawings, Figure 1 is a side elevation of this improved axle. Fig. 2 is a transverse vertical section on dotted line 2 2 of Fig. 1. Fig. 3 is a section taken on dotted line 3 of Fig. 2.

In the construction of an axle embodying this invention I provide an axle proper, 1, in this instance formed from a round steel bar bent to provide an arch near its middle portion, having a top bar 2, diverging sides 3, and oppositely-extending arms 4, the latter carrying wheels 5 at their outer ends. The two arms 4 are connected by means of two chord members 6, secured together side by side and having grooves 7 in their meeting faces to receive the diverging sides 3 of the arch. At their ends the chord members 6 rest upon the upper sides of the arms 4, being secured rigidly to said arms by means of clips 8, which clips surround the arms 4 upon their under sides and extend upward through suitable openings in the chord members 6, being screw-threaded at their upper ends to receive the nuts 9. The chord members are also secured together by means of bolts 10 passing transversely through them.

The lower member 11 of the fifth-wheel is secured to the upper bar 2 of the axle proper by means of the downwardly-extending arms 12, bifurcated at their lower ends to receive said upper bar. The bar is held in said bifurcation by means of bolts 13 passing through suitable openings 14 in the lower ends of said arms beneath said upper bar. The lower member of the fifth-wheel also has a central tubular bearing-boss 15. The upper member 16 of the fifth-wheel is provided with a similar tubular bearing-boss 17 coincident with the bearing-boss 15 of the lower member, and a king-bolt 18, passing through both of said bearing-bosses, is held in position therein by means of a cotter-pin 19 at its lower end. The upper member of the fifth-wheel is also provided with two forwardly-extending bracket-arms 20 for supporting a portion of the vehicle-body. Two posts 21, rising from the upper member 16, support the forward bolster 22 of the vehicle.

The tongue 23 of the vehicle is pivotally secured to the top bar 2 of the axle proper by means of clips 24 passing beneath said top bar and extending through suitable openings in a plate 25. The upper end of the clips are screw-threaded to receive nuts 26, and the plate 25 is fastened to the rear end of the tongue and upon the upper side thereof by means of bolts 27. Rods 28 connect the ends of the axle with the tongue 23, said rods being secured at their opposite ends to the tongue and to the chord members 6.

By the construction hereinbefore outlined it will be seen that the arch of the axle proper is supported by means of the chord members 6. By reason of the arched construction the axle is adapted to vehicles having small forward wheels. The weight of the load placed upon this axle is carried upon the arch of the axle proper. The tendency of the weight to crush said arch is counteracted by means of the chord members 6, which being secured to the axle proper at opposite sides of the arch prevent the spreading of the ends of the arch, and therefore prevent the crushing of said arch. The simple construction hereinbefore shown and described permits of an easy separation of the parts for renewal or repair. The lower part of the fifth-wheel may be removed from the remainder of the wagon by withdrawing the cotter-pin 19 from the lower end of the king-bolt 18, and the lower member of the fifth-wheel may be removed from the axle by withdrawing the bolts 13, passing through the arms 12 of said lower member. The tongue may be withdrawn from the upper bar 2 of the arch by unscrewing the nuts 26 from the clips 24.

My invention is not restricted to the precise construction and arrangement shown and described herein, as such construction and arrangement may be modified or varied by those skilled in the art without departing from the spirit and scope of my invention.

I claim as my invention—

1. In an axle, in combination, an axle member comprising two horizontal arms and a central arched portion; and two chord members secured to said arms and receiving between them the sides of said arched portion.

2. In an axle, in combination, an axle member comprising two horizontal arms and a central arched portion; two chord members secured together, said chord members being grooved to receive between them the sides of said arched portion; and clips for securing said chord members to said arms.

3. In an axle, in combination, a metallic axle member formed from a bar bent to provide a central arched portion and two arms; and two straight wooden chord members secured to said arms and receiving between them the sides of said arched portion for preventing the sides of said arched portion from spreading.

4. In an axle, in combination, a metallic axle member formed from a bar bent to provide a central arched portion and two horizontal arms; two straight wooden chord members secured to said arms, said chord members being grooved to receive between them the sides of said arched portion; bolts for securing said chord members together; and clips for securing said chord members to said horizontal arms.

5. In running-gear, in combination, an arched axle; a tongue connected with the arched portion of said axle; means for preventing the sides of said arched portion from spreading; and means for rigidly connecting the end portions of said axle with said tongue.

6. In running-gear, in combination, an arched axle; a tongue; means for connecting the end of said tongue with the arched portion of said axle; means for preventing the sides of said arched portion from spreading; and rods rigidly connecting said tongue with the end portions of said axle member.

7. In running-gear, in combination, a fifth-wheel having two downwardly-extending arms, bifurcated at their lower ends; an arched axle pivotally supported in the bifurcations of said arms; and withdrawable means for retaining said axle in said arms.

8. In running-gear, in combination, a fifth-wheel comprising an upper and a lower member rotatably secured together; an axle pivotally connected with the lower fifth-wheel member; a tongue connected at one end with said axle; and means for connecting the ends of said axle with said tongue.

9. In running-gear, in combination, a fifth-wheel comprising an upper and a lower member rotatably secured together; an axle having an arched central portion, which central portion is pivotally connected with the lower member of said fifth-wheel; a tongue connected at one end with said central portion; and means for connecting the ends of said axle with said tongue.

LOUIS A. KEENE.

Witnesses:
J. E. DAVIS,
C. P. CONGDON.